United States Patent [19]

Tominaga et al.

[11] Patent Number: 5,008,699
[45] Date of Patent: Apr. 16, 1991

[54] DEVICE FOR DRIVING SHUTTER

[75] Inventors: Shinji Tominaga; Takeshi Hashimoto, both of Osaka, Japan

[73] Assignee: Minolta Camera Kabushiki Kaisha, Osaka, Japan

[21] Appl. No.: 419,967

[22] Filed: Oct. 11, 1989

Related U.S. Application Data

[62] Division of Ser. No. 202,023, Jun. 3, 1988, Pat. No. 4,920,372.

[30] Foreign Application Priority Data

Jun. 4, 1987 [JP] Japan .................. 62-141073
Jun. 4, 1987 [JP] Japan .................. 62-141074
Jun. 4, 1987 [JP] Japan .................. 62-141075

[51] Int. Cl.$^5$ .................................. G03B 7/08
[52] U.S. Cl. .............................. 354/457; 354/435
[58] Field of Search ............ 354/402, 435, 457, 418, 354/127.12; 310/317

[56] References Cited

U.S. PATENT DOCUMENTS

| | | | |
|---|---|---|---|
| 4,290,678 | 9/1981 | Marcus | 354/127.12 |
| 4,303,324 | 12/1981 | Marcus | 354/402 |
| 4,464,039 | 8/1984 | Ishida | 354/418 |
| 4,595,854 | 6/1986 | Yano et al. | 310/317 |
| 4,609,275 | 9/1986 | Ishiguro | 354/435 |
| 4,630,916 | 12/1986 | Ishiguro et al. | 354/418 |
| 4,799,078 | 1/1989 | Hayama | 354/418 |
| 4,851,871 | 7/1989 | Ooe et al. | 354/435 |
| 4,884,090 | 11/1989 | Tanaka et al. | 354/457 |
| 4,920,373 | 4/1990 | Tominaga et al. | 354/457 |

FOREIGN PATENT DOCUMENTS

| | | |
|---|---|---|
| 58-97035 | 6/1983 | Japan . |
| 61-80228 | 4/1986 | Japan . |
| 61-295535 | 12/1986 | Japan . |
| 63-6534 | 1/1988 | Japan . |
| 63-6535 | 1/1988 | Japan . |

Primary Examiner—Russel E. Adams
Attorney, Agent, or Firm—Burns, Doane, Swecker & Mathis

[57] ABSTRACT

In a device for driving a shutter having a bimorph element displaceable or deformable by the application of a voltage thereto, and so constructed as to open and close the shutter by using the displacing or deforming effect of the bimorph element, the device comprises a first switching means for short-circuiting the bimorph element at a usual time and a second switching means for releasing the bimorph element from the short-circuited state caused by the first switching means only at the time of opening the shutter and at the same time charging the bimorph element with a voltage from an electric source for the bimorph element, so that the shutter can be surely closed at the usual time.

9 Claims, 6 Drawing Sheets

DEVICE FOR DRIVING SHUTTER

This application is a divisional of application Ser. No. 202,023, filed Jun. 3, 1988 now U.S. Pat. No. 4,920,372.

BACKGROUND OF THE INVENTION AND RELATED ART STATEMENT

The present invention relates to a device for driving shutter of a camera in which a bimorph element (a piezoelectric element) displaceable or deformable by the application of a voltage thereto is used as an actuator.

Figure 8:
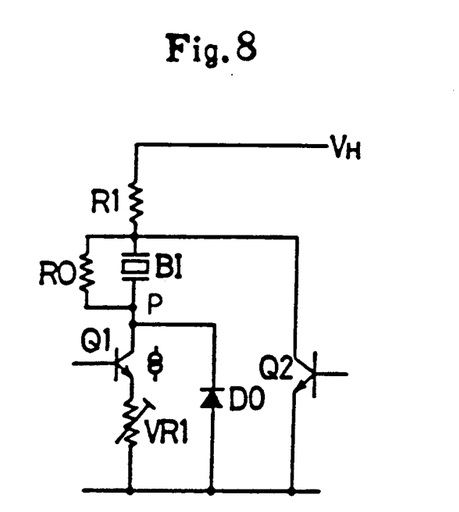
FIG. 8 is a diagram of a shutter opening and closing circuit section of a conventional device for driving a shutter.

A conventional circuit of a device for driving a shutter of a camera in which a displacing or deforming effect of a bimorph element caused by the application of a voltage thereto is used as a force for driving a shutter of a camera is shown in FIG. 8 of the appended drawings. In FIG. 8, $V_M$ is a high voltage electric source line to which connected is a capacitor for an electronic flash of a camera. BI is a bimorph element. Q1 is a transistor which is turned on at the time of opening the shutter to charge the bimorph element BI. Q2 is a transistor which is turned on at the moment of closing the shutter to discharge the electricity of the bimorph element BI. D0 is a diode for preventing a potential of the connecting point P of the bimorph element BI and the transistor Q1 from becoming a highly negative voltage at the moment of turning on the transistor Q2. R0 is a resistance connected in parallel to the bimorph element BI and this resistance R0 is provided for the purpose of preventing a leak current from being fed to a condenser capacitance of the bimorph element BI to erroneously operate the device for driving a shutter at other time than the time of opening the shutter.

By operating the transistors Q1, Q2 in such conditions as shown in the following table 1, the bimorph element BI is charged or discharged to be displaced or deformed so that the shutter can be opened or closed.

TABLE 1

|    | usual time | opening the shutter | closing the shutter |
|----|------------|---------------------|---------------------|
| Q1 | OFF        | ON                  | ON                  |
| Q2 | OFF        | OFF                 | ON                  |

As shown in FIG. 8, a method of charging the bimorph element with a constant current is known. However, in this case in which the abovementioned resistance R0 is connected in parallel with the element BI, a small value of this resistance R0 is not preferable for obtaining a constant current and on the countrary a large value of the resistance lowers the effect of preventing a leak current.

As a result, when a resistance is connected in parallel to the bimorph element, it is difficult to set the value of the resistance, and a problem of preventing erroneous operation of the device for driving a shutter has not been sufficiently solved yet.

For the purpose of solving the abovementioned problem, the present invention is made. And an object of the present invention is to prevent erroneous operation of a device for driving a shutter in which a bimorph element is used as an actuator caused by a leak current or the like, by short-circuiting the bimorph element all the times except an exposure time.

SUMMARY OF THE INVENTION

In a device for driving a shutter having bimorph element displaceable or deformable by the application of voltage thereto and an electric source for applying voltage to the bimorph element, and so constructed as to open and close the shutter by using a displacing or deforming effect of the bimorph element, a device according to the present invention comprises a first switching means for short-circuiting the bimorph element at a usual time and a second switching means for releasing the bimorph element from the short-circuited state caused by the first switching means only at the time of opening the shutter and at the same time charging the bimorph element with electricity from an electric source for the bimorph element. Thus according to the present invention, the bimorph element is short-circuited at a usual time to keep the value of the displacement thereof to be zero, and at the time of opening the shutter the bimorph element is released from the short-circuited state and charged with electricity from the electric source for the bimorph element to be displaced so as to perform exposure so that the bimorph element can be perfectly short-circuited all the time except the time of opening the shutter and thereby erroneous exposure due to a leak current or the like can be surely prevented.

BRIEF DESCRIPTION OF THE DRAWINGS

Now the present invention will be described below with reference to the appended drawings, in which:

FIG. 2b is a sectional view of the mechanical section along the line II—II of FIG. 2a;

DETAILED DESCRIPTION OF PREFERRED EMBODIMENTS OF THE INVENTION

Figure 1:
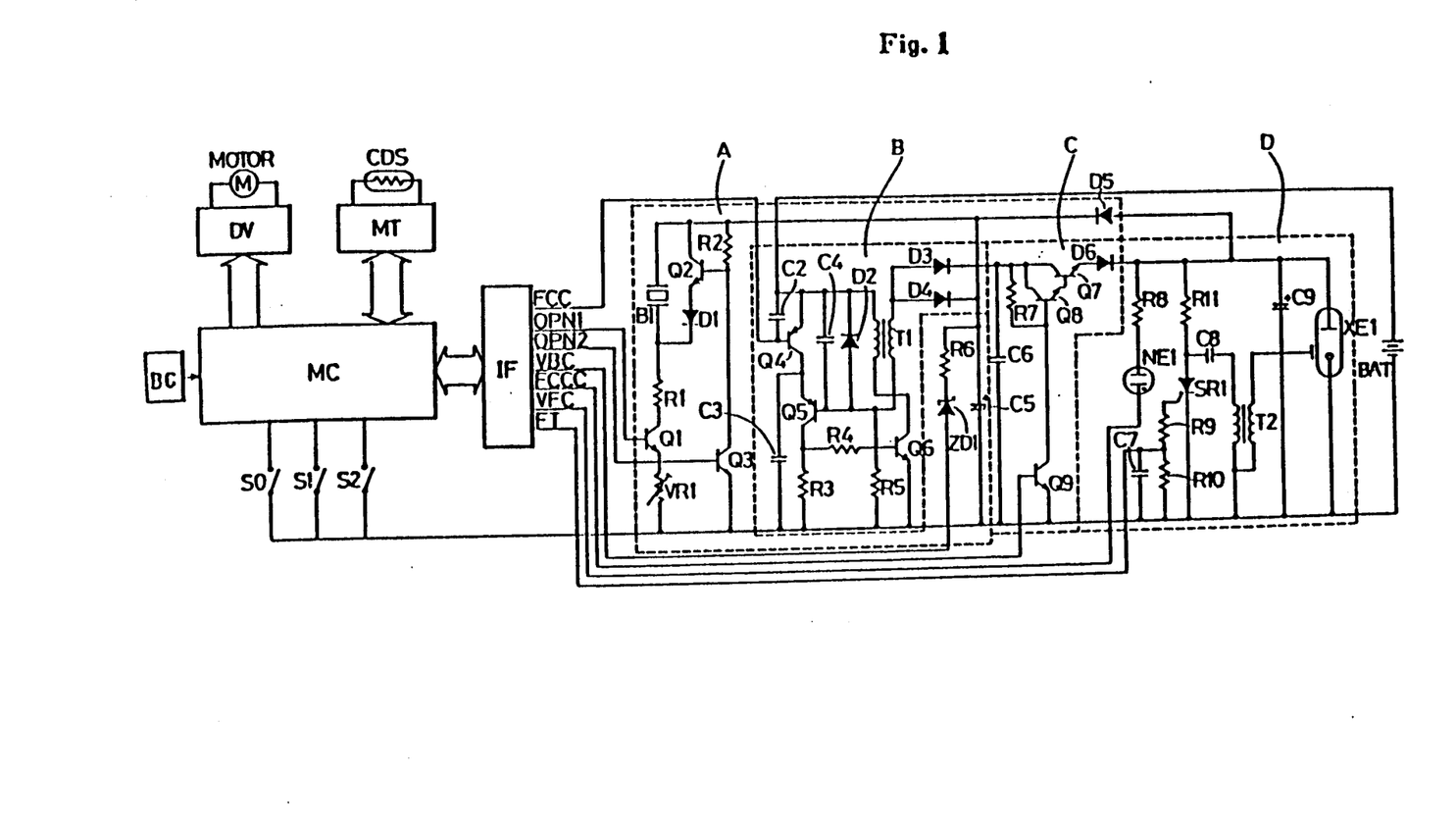
FIG. 1 is a diagram of a control circuit of a device for driving a shutter of an embodiment of the present invention.
Figure 2A:
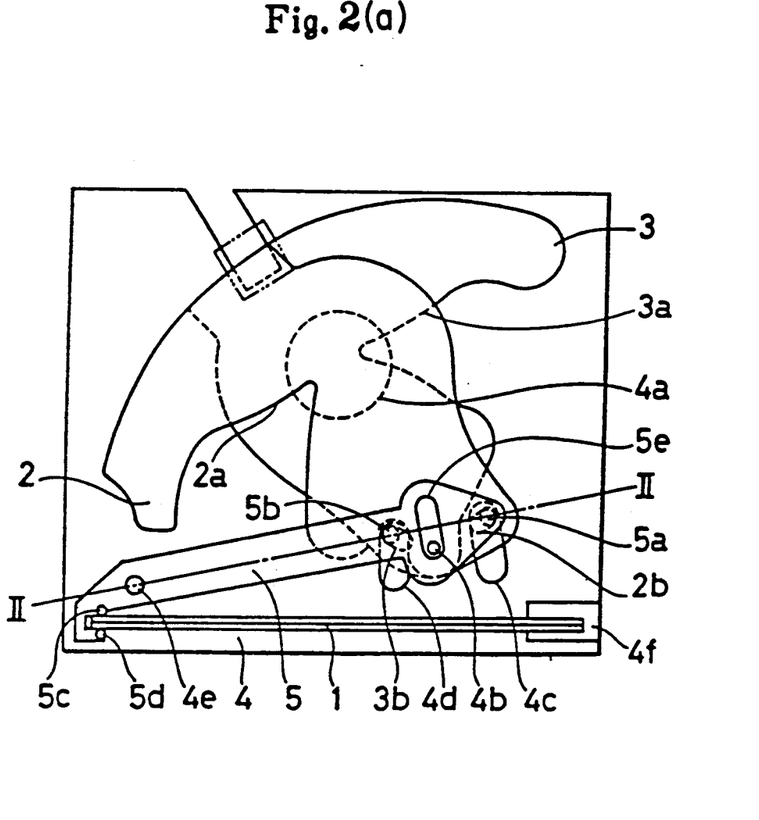
FIG. 2a is a plan view of a mechanical section of the device for driving a shutter.
Figure 2B:
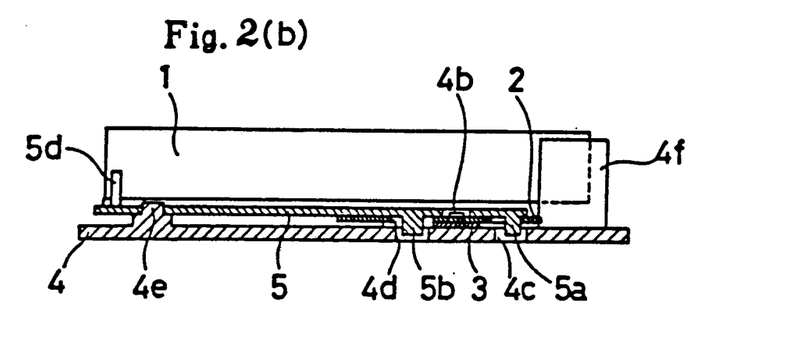

FIG. 1 is a diagram of a control circuit for a camera provided with a device for driving a shutter of an embodiment of the present invention and FIGS. 2a, 2b, show the construction of an embodiment of a mechanical section of the shutter.

Firstly, a mechanical section of the shutter is described with reference to FIGS. 2a, 2b.

The shutter device of this embodiment is of a type in which the shutter serves as an aperture diaphragm and the shutter is opened at a predetermined speed to an aperture value determined by a brightness of an object and a pair of shutter blades 2, 3 are simultaneously pivotally moved in the reverse directions respectively by a driving force generated in a bimorph element 1 and the pivotal movement of the shutter blades 2, 3 is stopped when a suitable exposure value is obtained to return the shutter blade to the initial positions.

Now, the construction and operation of each of these parts will be described.

The shutter blades 2, 3 are pivotally carried by a shaft 4b fixed on a shutter base plate 4, and the forms of the shutter blades 2, 3 are substantially symmetrical about a line connecting the center of an exposure aperture 4a and the center of the spindle 4b. Long holes 2b, 3b provided in the shutter blades 2, 3 respectively are engaged with engaging pins 5a, 5b provided on an opening and closing lever so that the shutter blades are pivotally moved by the displacement of the engaging pins 5a, 5b. V-shaped notched aperture 2a, 2b provided in the shutter blades 2, 3 respectively open or close the exposure aperture with the abovementioned pivotal movement of the shutter blades 2, 3. The exposure aperture 4a and long openings 4c, 4d for preventing the movement of the closing lever 5 from being obstructed by the contact of the engaging pins 5a, 5b on the closing lever 5 with the shutter base plate 4 are provided in the shutter base plate 4.

The shutter opening and closing lever 5 is pivotally carried by a shaft 4e on the shutter base plate 4. At the right end portion (seen in the FIGS. 2a, 2b) of the lever 5, a long hole 5e for preventing the contact of the lever 5 with the shaft 4b is provided. And two pins 5a, 5b to be engaged with the long holes 2b, 3b in the shutter blades 2, 3 are provided substantially symmetrically about the long hole 5e. Further, as seen in the left side in the figure, two pins 5c, 5d for clamping the end portion of the bimorph element 1 therebetween are provided on a U-Shaped end portion of the lever 5. The bimorph element 1 is held at one end through the pins 5c, 5d by the lever 5, and fixed at the other end on the shutter base plate 4 by a holding plate 4f.

In the closed state of the shutter as shown in FIGS. 2a, 2b, by applying a voltage to the bimorph element 1, the bimorph element 1 rotates clockwise with the end thereof on the side of the holding plate 4f functioning as a fixed end to generate a driving force. The opening and closing lever 5 is pivotally moved clockwise about the shaft 4e by the driving force, so that the inner peripheral walls of the long holes 2a, 2b of the shutter blades 2, 3 are pushed to pivotally move the shutter blades 2, 3 respectively in such a direction as to open the exposure aperture 4a.

When the opening degree of the shutter reaches a predetermined value, a control circuit for controlling the bimorph element 1 stops applying a voltage to the bimorph element to stop the opening movement of the shutter blades 2, 3, and thereby to return the shutter blades 2, 3 to the initial positions.

Now, an embodiment of a control circuit for controlling the abovementioned operation is described with reference to FIG. 1.

FIG. 1 is a circuit diagram of a control system of a camera provided with a shutter driven by a driving force of a bimorph element. In the figure, BAT is an electric source (battery) using a dry battery or the like of the camera, and all electricity used in this system is supplied from this electric source BAT. MC is a microcomputer performing a sequtial control of a light metering section MT, a motor driving section DV, and the whole of a shutter opening and closing circuit A, a boosting circuit B, a switching circuit C and a circuit D for emitting a flashlight through an interface section IF. To the microcomputer MC, a main switch S0, a switch S1 for starting light metering, a release switch S2 are connected. BC is a circuit for checking the source voltage (battery) and data of the checking circuit BC are fed to the microcomputer MC.

Now, the operation of this system is described by dividing the system into a plurality of functional blocks.

1. A shutter opening and closing circuit A

BI is a bimorph element for driving a shutter, and the bimorph element BI is deformed as abovementioned when charged by a charging circuit consisting of a transistor Q1, a resistance R1 and a variable resistance VR1 or discharged by a discharging circuit consisting of a transistors Q2, Q3, a resistance R2 and a diode D1, to open and close the shutter. The charging and the discharging circuits are supplied with electricity from a capacitor C5 for driving the bimorph element BI or a capacitor C9 for emitting a flashlight.

In other words, these capacitors C5, C9 function as electric sources for the bimorph element BI.

The transistor Q2 constitutes a switching means for short-circuiting the bimorph element BI at the usual time (time not opening or closing the shutter), and the transistors Q1, Q3 constitute a switching means for releasing the bimorph element BI from the short-circuiting by the transistor Q2 only at the time of opening the shutter and at the same time for charging the bimorph element BI.

The turning on and off of the transistors Q1, Q3. Q2 at the usual time and at the times of opening and closing the shutter is controlled as shown in the following table 2. And the detail of the operation will be described later.

TABLE 2

|    | usual time | opening the shutter | closing the shutter |
|----|------------|---------------------|---------------------|
| Q1 | OFF        | ON                  | OFF                 |
| W3 | OFF        | ON                  | OFF                 |
| Q2 | ON         | OFF                 | ON                  |

The transistor Q2 is arranged as a transistor of a self-biasing type through the resistance R2 and is conductive at the usual time, not conductive at the time of opening the shutter and conductive at the time of closing the shutter, and discharges the electric charge of the bimorph element 1 at the time of closing shutter and at the usual time. As the electric source for driving the bimorph element B1, either one having a higher voltage of the capacitor C5 for the bimorph element BI and the capacitor C9 for emitting a flashlight is used.

To make the transistor Q2 conductive at the usual time, not only the abovementioned self-biasing transistor is used but the transistor Q2 may be provided with a circuit which monitors the voltage of the capacitor as the electric source and turns on the transistor Q2 in accordance with the value of the voltage.

The diode D1 is inserted in series with the transistor Q2 for protecting the transistor Q2. Since the reverse voltage $V_{EBO}$ between emitter and base of the short-circuiting transistor Q2 is as low as a few volts, at the time of driving the bimorph element BI a mechanical load induces a piezoelectric effect of the bimorph element BI, and the diode D1 prevents the transistor Q2 from being broken by an electromotive force generated by the piezoelectric effect.

The capacitor C5 for driving the bimorph element BI is charged through a rectifying diode D4 by the below-mentioned boosting circuit B or charged through a rectifing diode D5 by a capacitor C9 for emitting a flashlight in the belowmentioned flashing circuit D.

Further, a zener diode ZD1 and a resistance R6 are provided for detecting the voltage $V_{C5}$ of the capacitor C5 for the bimorph element B1, and the zener current detects the voltage $V_{C5}$ by measuring $$I_{ZD}=(V_{C5}-V_{ZD})/R6$$

at a terminal $V_{BC}$ for detecting the voltage of the capacitor C5 for the bimorph element BI in the interface section.

2. A boosting circuit B

Transistors Q4 to Q6, a diode D2, resistances R3 to R5, capacitor C2 to C4 and a transformer T1 constitute the boosting circuit B which boosts the electric source voltage $V_{BAT}$, and charges the capacitor C5 for the bimorph element BI through the rectifying diode D4 and charges the capacitor C9 for emitting a flashlight through a rectifying diode D3 and the belowmentioned switching circuit C.

A base of the transistor Q4 for starting the boosting is connected to a terminal FCC of the interface section IF for controlling the boosting, and by turning the output of the terminal FCC to "L", a high voltage $V_M$ is produced from a secondary side of the boosting transformer T1.

3. A switching circuit C

Transistors Q7 to Q9, a diode D6 and a resistance R7 constitute the switching circuit C. By switching between the secondary side of the boosting transformer T1 and the circuit D for emitting a flashlight, the switching circuit C controls charging or not charging the flashing capacitor C9 for emitting a flashlight and a capacitor C8 for triggering flashlight.

A rectifying diode D6 prevents the transistors Q7, Q8 from being broken by the application of a voltage of the flashing capacitor C9 to between respective bases and emitters of the switching transistors Q7, Q8 when the transistor Q9 is ON. The switching transistors Q7, Q8 are connected in the way of Darlington connection.

Since a voltage $V_{P-P}$=about 400 V is produced on a cathode side of the rectifying diode D3 in the operation of the boosting circuit B, a voltage (for example, $V_{P-P}$=350 to 400 V) above the tolerate voltage $V_{CED}$ (for example, 300 V) of a collector-emitter of each of the transistors Q7, Q8 may be applied on the switching transistors Q7, Q8 depending upon the charge condition of the capacitor C9 for emitting a flashlight. So the capacitor C6 is provided as a smoothing condenser for preventing the transistors Q7, Q8 from being destroyed or broken down by the application of such a high voltage thereto.

If a charge voltage of the capacitor C9 for emitting a flashlight is OV, the anode of the diode D6, namely, the potential of the emitter of the transistor Q7 is a voltage covering one step of the diode D6. On the other hand, as shown in the figure, since the capacitor C5 for the bimorph element BI is connected through a diode D4 to the secondary side of the transformer T1 and also transistors Q7, Q8 are connected through a diode D3 to the secondary side of the transformer T1, the potential of a collector of the transistors Q7, Q8 is (charge voltage of the capacitor C5)+(voltage covering a stage of the diode D4)−(voltage covering a stage of the diode D3).

In a device for driving a shutter according to the present embodiment, as belowmentioned, since the transistors Q7, Q8 for switching are turned on when the capacitor C5 for the bimorph element BI reaches 230 V, the voltage between the collector and the emitter of the transistor Q7, Q8 is at most (230 V (charge voltage of the capacitor C5 for the bimorph element BI)+voltage covering a stage of the diode D4)−(voltage covering a stage of the diode D3)−(voltage covering a stage of the diode D6). Therefore, such a high voltage as $V_{P-P}$=350 to 400 V is not applied between the collector and the emitter of the transistors Q7, Q8. In practice, however, there are impedances in wirings connecting the transformer T1 and the diode D3, and the diode D4 and the capacitor C5, to generate a voltage and a voltage about 400 v will be applied to the collectors of the transistors Q7, Q8. For preventing the application of such a high voltage, the abovementioned capacitor C6 is provided.

A neon tube NE1 and a resistance R8 is provided for detecting the voltage $V_{C9}$ of the capacitor C9 for emitting a flashlight, and detects the voltage $V_{C9}$ by measuring the current $I_{NE}$ of the neon tube NE1 at a terminal VFC for detecting the voltage of the capacitor C9 for emitting a flashlight of the interface section.

4. A circuit D for emitting a flashlight

C8 is a capacitor for triggering a flashlight, and C9 is a capacitor for emitting a flashlight. By discharging a electric charge in the capacitor C8 for triggering a flashlight which is charged through a resistance R11, through a thyristor SR1 and the primary side of a transformer T2 for triggering, a trigger voltage is generated on the secondary side of the transformer T2 for triggering. A xenon tube XE1 is excited by the trigger voltage, and a electric charge in the capacitor C9 for emitting a flashlight is discharged through this xenon tube XE1.

Figure 3:
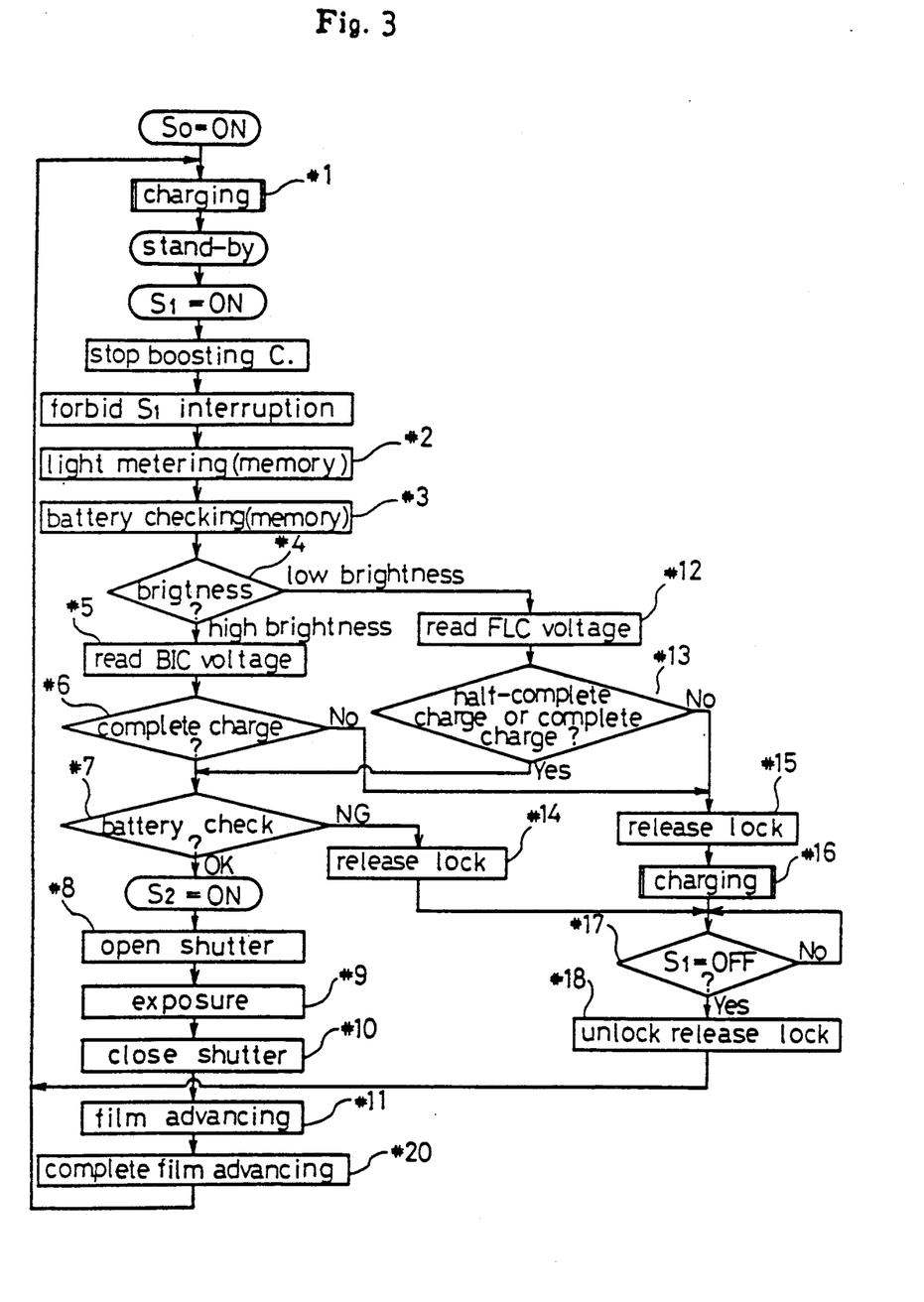
FIG. 3 is a flow chart of an operation of a camera provided with the device for driving a shutter.
Figure 4:
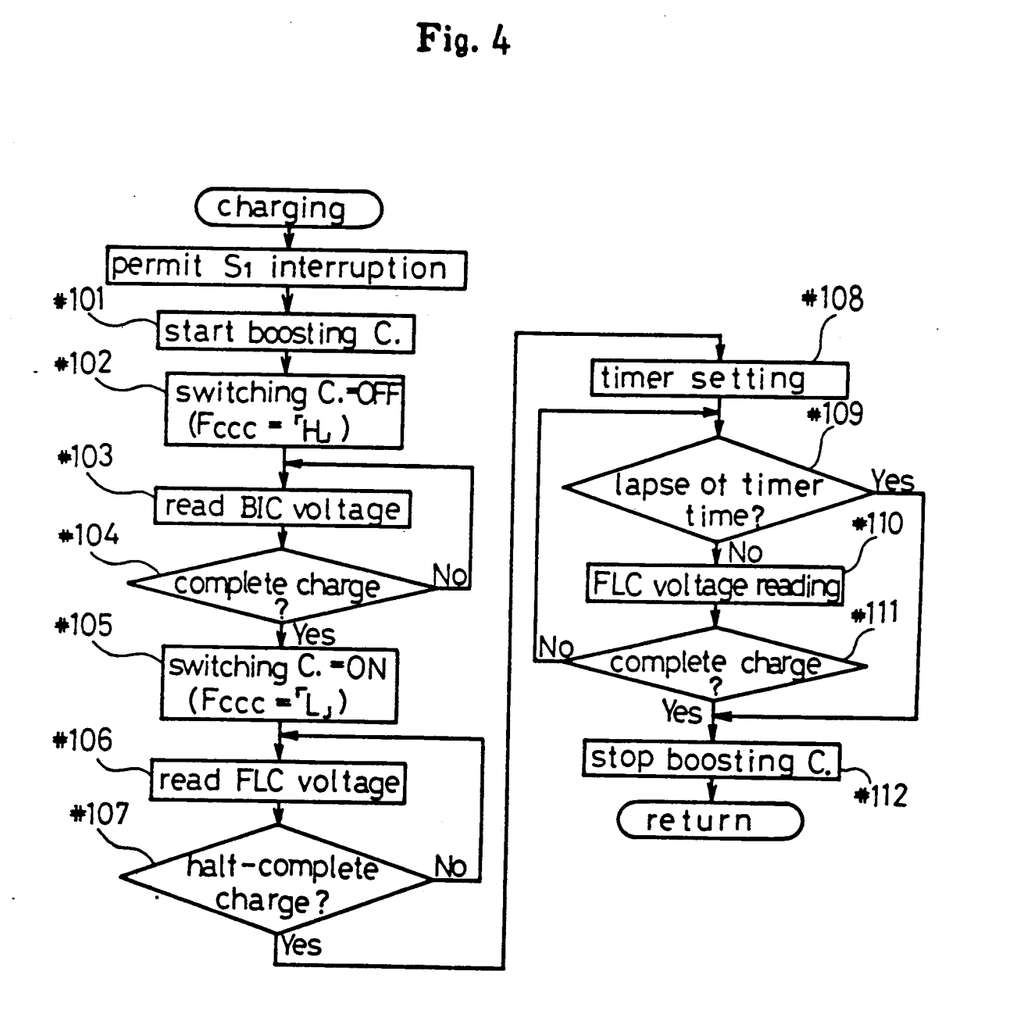
FIG. 4 is a flow chart of a subroutine "charging" of FIG. 3.

A flow chart of the operation of a camera of this embodiment is shown in FIG. 3 and a flow chart of a subroutine "charging" shown in FIG. 3 is in FIG. 4.

Now, the operation of the camera will be described in the following with reference to FIGS. 3, 4.

Firstly when a lens cover (not shown) is opened as a preparatory operation for photographing, the main switch S0 is interlockingly turned on. When the main switch S0 being turned on, the capacitor C5 for driving the bimorph element BI and the capacitor C9 for emitting a flashlight are charged for opening and closing the shutter (#1).

Now, a sequence of "charging" will be described with reference to FIG. 4.

By permitting an interruption of a switch S1 for starting light metering and then turning a boosting circuit controlling signal FCC of the interface section IF to "L", the boosting circuit B starts the operation (#101) and a high voltage is generated from the secondary side of the boosting transformer T1.

Then by turning to "H" a signal FCCC for forbidding to charge the capacitor C9 for emitting a flashlight of the interface section IF, the transistor Q9 in the switching circuit C is turned on and the transistors Q7, Q8 therein are turned off (#102), and a charging passage from the boosting circuit A to the circuit D for emitting a flashlight i.e., the capacitor C9 for emitting a flashlight is opened. As a result, a charging current generated on the secondary side of the boosting transformer T1 charges only the capacitor C5 for driving bimorph element BI through the rectifying diode D4.

In this operation, the high voltage generated on the secondary side of the transformer T1 is applied only through the rectifying diode D3 to the collectors of the transistors Q7, Q8, but the voltage is controlled within the tolerate voltage of the transistors Q7, Q8 by means of the smoothing capacitor C6.

When it is detected that the voltage of the capacitor C5 for driving the bimorph element BI rises to a level of completing the charge (for example, 230 V) (#103,

104), the signal FCCC of the interface section IF for forbidding to charge the capacitor C9 for emitting a flashlight is turned to "L" (#105). Thereby the transistor Q9 is turned off, and thus the switching transistors Q7, Q8 are self-biased by the biasing resistance R7 and turned on to start charging the capacitor C9 for emitting a flashlight. When the voltage of the capacitor C9 reaches half the level of completing the charge (for example, the neon tube lighting voltage ≈ 270 V), it is detected (#106, 107) and a timer is set for limiting the charging time (#108). This timer is provided as the reason described below. When the power of the electric source is lowered, the voltage of the capacitor C9 for emitting a flashlight sometimes does not reach the level of completing the charge (for example, 300 V). If charging is carried on in this case, the lowering of the power of the electric source is further accelerated. Consequently, after the voltage of the capacitor C9 for emitting a flashlight reaches half the level of completing the charge (for example, 270V), the operation of the boosting circuit B is stopped (#112) as completing the charge after a predetermined time (set by a timer) has lapsed from that time (#109) similarly to the case that the voltage reaches the level of completing the charge (for example, 300V) (#110, #111) even if the voltage then has not reached that level.

Thus in this system according to the present invention, the capacitor C5 for driving the bimorph element BI is charged prior to the capacitor C9 for emitting a flashlight. The capacity of the capacitor C5 has only to be less than 10 μF in view of the bimorph characteristic, and the time required for charging the capacitor C5 is about several hundred milliseconds. Consequently, a waiting time for completing the charge when the brightness of an object is high can be shortened by the abovementioned sequence.

When the abovementioned sequence is terminated, the operation is in the stand-by state to wait that the switch S1 for starting light metering is turned on.

When the switch S1 for starting light metering is turned on, the operation of the boosting circuit is stopped and the interruption of the switch S1 is forbidden, and thereafter light metering is carried out to judge whether the brightness of an object is high or low, then the voltage of the electric source (battery) being checked and these results are stored (#2, #3). According to the abovementioned result of light metering, the voltage of the capacitor C5 for driving the bimorph element BI is checked when the brightness is high and the capacitor C9 for emitting a flashlight is checked when the brightness is low (#4, 5, 6, 12, 13).

When the voltage of the capacitor C5 or C9 does not reached the predetermined value, an exposure operation cannot be ensured, and the capacitor C5 or C9 is charged (#16) with a shutter release operation being locked (#15). According to this system, in the case, the release operation is not unlocked even after completing the charge if the finger is not once off from the release button or if the switch S1 is not turned off (#17, #18) to prevent erroneous photographing of the user.

If the voltage of the capacitor C5 or C9 reaches the predetermined value, the result of checking the electric source (battery) voltage is judged (#7). And when the electric source voltage is below the predetermined value, the operation cannot be ensured similarly to the case of uncompleting the charge, and the shutter release operation lock is locked (#14). In this case, similarly as abovementioned, the release operation is not unlocked as long as the finger is not off the release button or the switch S1 is not turned off.

When the electric source (battery) voltage is above the predetermined value, the exposure operation is carried out by turning on the release switch S2.

When the electric source voltage is above the predetermined value, if the switch S1 is turned off before the switch S2 is turned on, the program advances to the charging sequence (#1) to wait that the switch S1 is turned on again.

Firstly, a signal 2 (OPN2) for opening the shutter of the interface section IF is turned to "H", the trasistor Q3 in the circuit A for opening and closing the shutter is turned on, the transistor Q2 for short-circuiting the bimorph element BI which has been kept in the ON state by self-biasing is turned off to release the bimorph element BI from the short-circuited state. At the same time, a signal 1 (OPN1) for opening the shutter is turned to "H" (#8) and thereby the transistor Q1 for charging the bimorph element BI is turned on to start charging the bimorph element BI. As a result, the displacing amount of the bimorph element BI increases in accordance with the amount of the stored electric charge, and the shutter blades are moved to open the position to carry out the exposure (#9).

In this system, the line of the signal 1 (OPN1) is a constant current biasing line and the bimorph element BI is charged with a constact electric current.

When an expected exposure is obtained, the signals 1, 2 for opening the shutter are turned to "L". At this moment, charging the bimorph element BI is stopped and the transistor Q3 is turned off, so that the transistor Q2 for short-circuiting the bimorph element BI is self-biased by a biasing resistance R2 to be turned on to discharge the electric charge stored in the bimorph element BI through the transistor Q2. As a result, displacing amount of the bimorph element BI becomes 0 and the shutter is closed (#10).

Then, a film in the camera is advanced with one frame (#11) and after completing this (#20), the abovementioned capacitors C5, C9 are charged (#1) and the operation is in the stand-by state.

Figure 5:
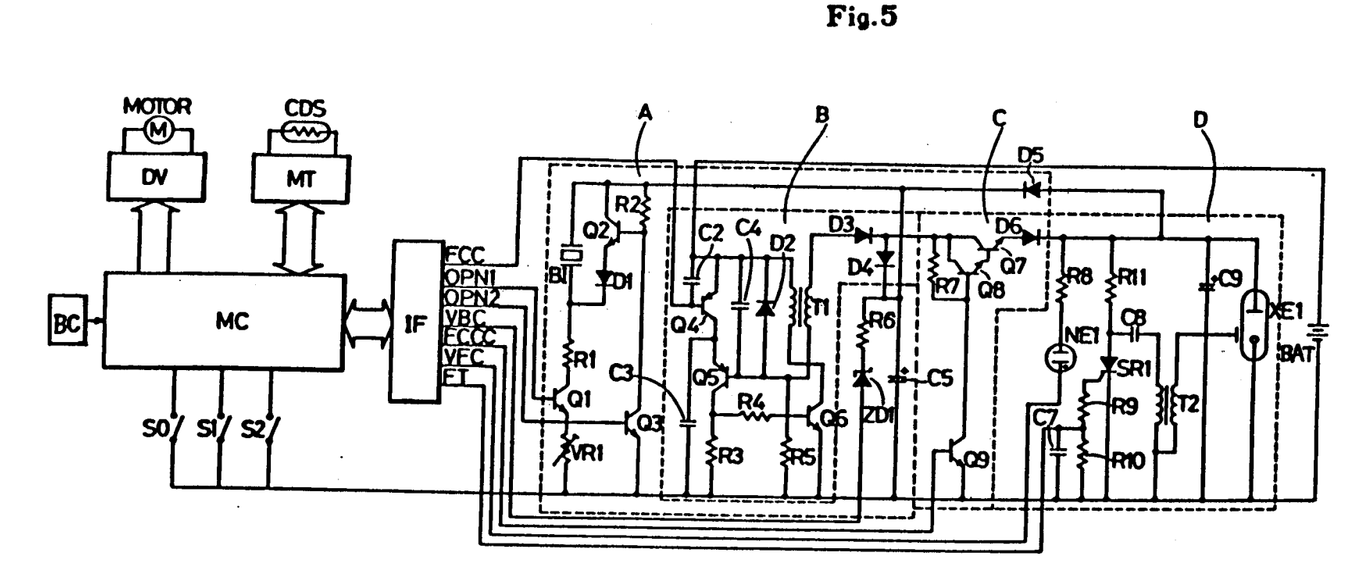
FIG. 5 is a circuit diagram of a second embodiment of the present invention.

A circuit diagram of another embodiment of a system for controlling a camera is shown in FIG. 5.

In the embodiment of FIG. 1, the capacitor C6 for protecting a semiconductor element is provided so as to prevent the semiconductor element in the switching circuit C from being destroyed or broken down. In this embodiment shown in FIG. 5, however, the connection of the diodes D3, D4 is modified instead of providing the capacitor C6. In other words, by connecting the passage for charging the capacitor C5 in such a manner that the passage comes from the cathode side of the rectifying diode D3 is connected to the capacitor C5 through the rectifying diode D4, the voltage generated from the secondary side of the boosting circuit B and applied to the switching circuit C is passed through the rectifying diode D4 to be smoothed by the capacitor C5 for driving the bimorph element BI. Consequently, the capacitor C5 for driving the bimorph element BI serves also to protect the switching circuit C.

With such a construction, the parts are decreased in number and the efficiency of the circuit operation can be raised.

Figure 6:
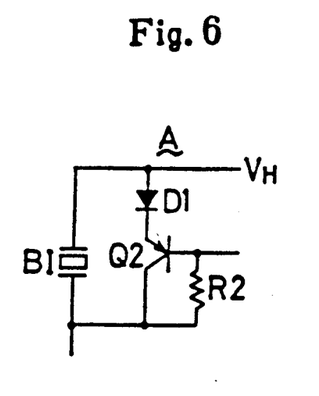
FIGS. 6, 7 are parts of circuit diagrams of other embodiments respectively of the present invention.

Further, the diode D1 for protecting the transistor Q2 for short-circuiting the bimorph element BI is connected in series with the transistor Q2 on the emitter side thereof in the above embodiment, but when the transistor Q2 is of a different type from that of the abovementioned embodiment, the diode D1 is provided between the high voltage electric source $V_H$ line and the emitter as shown in FIG. 6. In either case, the diode D1 has only to be inserted in a loop of short-circuitng the bimorph element BI in such a direction as to prevent the reverse voltage so that the transistor Q2 for short-circuitng the bimorph element BI can be protected from the reverse voltage of the bimorph element BI.

Further, in this embodiment, the capacitor C5 for driving the bimorph element BI and the capacitor C9 for emitting a flashlight are charged with the output of the boosting circuit B and not only the capacitor C5 for driving the bimorph element BI but also the capacitor C9 for emitting a flashlight can be used as the electric source for driving the bimorph element BI, and further, the diodes D4, D3, D5 and the like are connected between the capacitors C5, C9 in such a manner that when the voltage of the capacitor C9 is higher than that of the capacitor C5, the power of the capacitor C9, prior to that of the capacitor C5, can be used as the electric source for driving the bimorph element BI.

Relating to this point, it is conventionally known to provide a capacitor used only as the electric source for driving the bimorph element, but this capacitor has a capacity from a few $\mu F$ to 10 $\mu F$ at most in view of shortening the charging time and miniatuarizing the capacitor. On the other hand, the capacity of the capacitor for emitting a flashlight is as large as a few hundred $\mu F$. Consequently, when the capacitor for emitting a flashlight is sufficiently charged, it is preferable in view of stabilizing the operation to use preferentially this capacitor as the electric source for driving the bimorph element.

From this standpoint, in the abovementioned embodiment, since the capacitor C9 for emitting a flashlight in addition to the capacitor C5 for driving the bimorph element BI can be used as the electric source for driving the bimorph element BI, the capacity of the electric source as a whole becomes large thereby to stabilize the operation of driving the shutter. And further, in the embodiment, since the discharge ratio of the capacitor C5 for driving the bimorph element BI is lowered, the capacitor C5 has a sufficient electric charge even after emitting the flashlight or the like thereby to further stabilize the operation of driving the shutter. Besides, there is no passage through which an electric charge moves from the capacitor C5 for driving the bimorph element BI to the capacitor C9 for emitting a flashlight. In other words, the discharge from the capacitor C5 to the capacitor C9 is prevented, and the operation of emitting a flashlight has no change at all.

Figure 7:
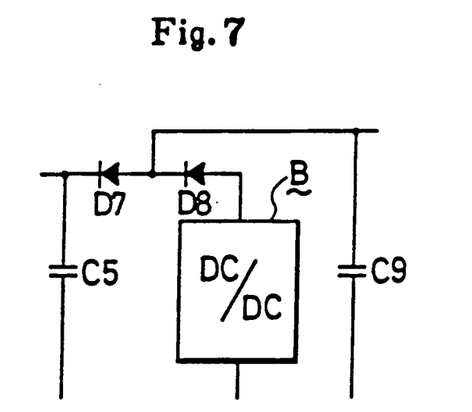

As a circuit arrangement for obtaining the abovementioned advantages, beside the abovementioned embodiment, a circuit may be used in which the capacitor C5 for driving the bimorph element BI is connected through the diodes D7, D8 to the output side of the boosting circuit B constituting a DC/DC converter, and the capacitor C9 is connected to the connecting point between the diodes D7, D8.

Further in the embodiment, the capacitor C5 for driving the bimorph element BI, the capacitor C9 for emitting a flashlight and the boosting circuit for charging the capacitor C5, C9 are provided and the switching circuit C is further provided between the boosting circuit B and the capacitor C9 for emitting a flashlight and is controlled in accordance with the voltage of the capacitor C5 for driving the bimorph element BI, and further, the capacitor C5 is charged prior to the capacitor C9. In this respect, in the conventional art, since a capacitor for emitting a flashlight is used as the electric source for the bimorph element BI, this capacitor has to be charged even if the capacitor for emitting a flashlight is not required to be charged because of a high brightness of an object to be photographed and the capacity of the capacitor being large, and a long waiting time is required disadvantageously. On the contrary in the abovementioned embodiment, a capacitor C5 having a small capacity for driving the bimorph element BI is additionally provided and the capacitor C5 is charged prior to the capacitor C9 for emitting a flashlight. And when the brightness of an object is high, only the capacitor C5 is charged for taking a photograph, so that the waiting time of the user can be extremely shortened. Further, only one boosting circuit B is required as the electric source for charging the capacitors C5, C9 respectively, so that the cost of the device can be lowered.

When, as described in the abovementioned embodiment, both of the capacitor C5 for driving the bimorph element BI and the capacitor C9 for emitting a flashlight can be used as the electric source for the bimorph element BI, and the switching circuit C comprising a semiconductor is provided between the capacitor C9 and the boosting circuit B so as to sequentially charge the capacitors C5, C9, the peak output voltage from the boosting circuit B is over the tolerate voltage of a semiconductor switching element sometimes to destroy or break down the semiconductor switching element if the capacitor C6 is not provided.

In this respect, by additionally providing the capacitor C6 for smoothing the output voltage between the boosting circuit B and the GND line of the switching circuit C as abovementioned, the semiconductor switching element can be prevented from being degraded, thus to stabilize the switching circuit C with only a slight additional cost.

Meanwhile, if a semiconductor switching element of a high tolerate voltage is used, such a switching element is generally of a low amplification factor and the impedance becomes high to cause disadvantages of decreasing the charging current, elongating the charging time, rising the cost, making larger the size of the package and the like.

Further in the abovementioned embodiment, the capacitor C5 for driving the bimorph element and the capacitor C9 for emitting a flashlight are provided as the electric source for the bimorph element BI, and in accordance with the brightness of an object, the voltage of different one of the capacitors C5, C9 is checked at the release time. In other words, when the brightness is high, it is unnecessary to emit a flashlight and the voltage of the capacitor C5 for driving the bimorph element BI is checked, and on the contrary, when the brightness is low, it is necessary to emit a flashlight and the voltage of the capacitor C9 for emitting a flashlight is checked. Here, the voltage VC5 of the capacitor C5 for driving the bimorph element BI can be charged through the diode D5 from the capacitor C9 for emitting a flashlight, and consequently if the result of checking the voltage of the capacitor C9 for emitting a flashlight is satisfactory, naturally the voltage of the capacitor C5 for driving the bimorph element BI is also satisfactory. The voltage of the capacitor C5 for driving the bimorph element BI required to ensure the driving of the shutter is, for example, at least 200V, while the voltage of the capacitor C9 for emitting a flashlight required to ensure the emitting of a flashlight is for example, at least 265V, and the voltages of the capacitors C5, C9 are checked according to the different checking levels respectively.

As abovementioned, by checking only one necessary capacitor for a high or a low brightness, the sequence can be simplified, and though the capacitor C5 for driving the bimorph element BI is generally of a small capacity and the voltage thereof is apt to be lowered only by the abovementioned checking, the discharge from the capacitor C5 can be controlled by omitting the checking when the brightness is low, so that the probability of the release lock being locked due to an incomplete charge to the capacitor C5 when the brightness is high can be lowered.

What is claimed is:

1. A driving device used in a camera, comprising:
   piezo-electric element;
   driving means for driving said piezo-electric element by applying an electrical voltage to said piezo-electric element;
   short-circuiting means connected in parallel to said piezo-electric element for short-circuiting said piezo-electric element; and
   controlling means for controlling said driving means and said short-circuiting means so as to short-circuit said piezo-electric element except when said driving means is in an active state.

2. A driving device of a camera, comprising:
   a first capacitor;
   a second capacitor;
   first voltage detecting means connected in parallel to said first capacitor for detecting a charged voltage in the first capacitor;
   first switching means connected in series to said first voltage detecting means for switching said first voltage detecting means between an enabled state and a disabled state;
   second voltage detecting means connected in parallel to said second capacitor for detecting a charged voltage in the second capacitor;
   second switching means connected in series to said second voltage detecting means for switching said second voltage detecting means between an enabled state and a disabled state; and
   control means for controlling said first and second switching means, thereby causing one of said first and second switching means to be enabled while causing the other to be disabled, so as to detect the voltage of a respective capacitor.

3. A driving device as stated in claim 2, further comprising:
   actuator means for performing an exposure operation driven by the electrical energy charged in said first capacitor; and
   flash means for emitting a flash light so as to perform a flash photography by the electrical energy charge din said second capacitor.

4. A driving device as stated in claim 3, further comprising:
   shutter means actuated by said actuator means for performing an exposure.

5. A device of a camera, comprising:
   a first capacitor for storing a charge for driving a first load;
   a second capacitor for storing a charge for driving a second load and connected to said first capacitor through a rectifying element, thereby enabling an electrical current to flow from said second capacitor to said first capacitor when a voltage charged in said second capacitor is larger than that of said first capacitor for enabling the first load to be driven by the charge in said second capacitor; and
   control means for controlling the first load and the second load so as to drive the first load in a first mode and drive the first and the second load in a second mode.

6. A device of a camera as stated in claim 5, further comprising:
   first voltage detecting means connected in parallel to said first capacitor for detecting the voltage charge thereof; and
   second voltage detecting means connected in parallel to said second capacitor for detecting the voltage charge thereof; wherein said control means controls said first and second voltage detecting means, so as to operate said first voltage detecting means in the first mode and operate said second voltage detecting means in the second mode.

7. A device of a camera as stated in claim 6, wherein said first load is a piezo-electric means for driving a shutter of the camera to perform an exposure, and said second load is an electronic flash for emitting a flash light, wherein said device further comprises light metering means for metering a brightness of an object and selecting means for selecting one of said first mode and second mode in accordance with the brightness of the object metered by said metering means.

8. A device of a camera as stated in claim 6, further comprising inhibit means for inhibiting a photographing operation of the camera when said first and second detecting means detect that the voltage of the first and second capacitors are lower than respective predetermined levels.

9. A device of a camera as stated in claim 5, further comprising:
   first voltage detecting means connected in parallel to said first capacitor for detecting the voltage charge of said first capacitor;
   first switching means connected in series to said first voltage detecting means for switching said first voltage detecting means between an enabled state and an disabled state;
   second voltage detecting means connected in parallel to said second capacitor for detecting the voltage charge of the second capacitor; and
   second switching means connected in series to said second voltage detecting means for switching said second voltage detecting means between an enabled state and a disabled state; wherein said control means controls said first and second switching means, so as to cause one of said first and second switching means to be enabled while the other is disabled so as to detect the voltage of a respective capacitor.

* * * * *